United States Patent
Kern

(10) Patent No.: US 6,737,605 B1
(45) Date of Patent: May 18, 2004

(54) SINGLE AND/OR DUAL SURFACE AUTOMATIC EDGE SENSING TRIMMER

(76) Inventor: Gerald L. Kern, 1512 4th St. SW., Wadena, MN (US) 56482

(*) Notice: Subject to any disclaimer, the term of this patent is extended or adjusted under 35 U.S.C. 154(b) by 0 days.

(21) Appl. No.: 10/349,353

(22) Filed: Jan. 21, 2003

(51) Int. Cl.[7] .......................... B23K 26/14; B23K 26/16
(52) U.S. Cl. .......................... 219/121.67; 219/121.68; 219/121.69
(58) Field of Search .............. 219/121.67, 121.68, 219/121.69, 121.72, 121.85

(56) References Cited

U.S. PATENT DOCUMENTS

| | | |
|---|---|---|
| 3,357,690 A | 12/1967 | Firestone |
| 3,970,497 A * | 7/1976 | Glover et al. ............... 156/182 |
| 4,469,931 A | 9/1984 | Macken |
| 4,533,814 A | 8/1985 | Ward |
| 4,977,805 A | 12/1990 | Corley, III |
| 5,161,697 A | 11/1992 | Quick |
| 5,444,188 A | 8/1995 | Iwayama et al. |
| 5,521,352 A | 5/1996 | Lawson |
| 5,578,229 A | 11/1996 | Barnekov et al. |
| 5,772,817 A | 6/1998 | Yen et al. |
| 5,798,927 A * | 8/1998 | Cutler et al. ................. 700/188 |
| 5,904,867 A * | 5/1999 | Herke ....................... 219/121.6 |
| 5,910,894 A * | 6/1999 | Pryor .......................... 700/95 |
| 6,294,124 B1 | 9/2001 | Bauer et al. |

* cited by examiner

Primary Examiner—M. Alexandra Elve
(74) Attorney, Agent, or Firm—Merchant & Gould P.C.

(57) ABSTRACT

An apparatus for trimming at least one overhanging layer from a workpiece, the apparatus comprising a laser configured to produce a cutting beam capable of cutting the overhanging layer, a cutting head comprising an upper element and a lower element, wherein the cutting head is configured to receive the cutting beam and split the cutting beam into a first portion and a second portion, wherein the first portion exits the cutting head through a upper element and the second portion exits the cutting head through a lower element, and a sensor configured to detect and control movement of the cutting head relative to the workpiece.

24 Claims, 4 Drawing Sheets

SINGLE AND/OR DUAL SURFACE AUTOMATIC EDGE SENSING TRIMMER

FIELD OF THE INVENTION

The present invention relates, in general, to a new and improved device and method for removing the edge of a laminated board which has a laminate veneer extending out from the top and/or bottom of the board. It more particularly relates to a device which automatically senses and cuts, with a laser, the edge of a laminated board which has a laminate veneer extended out from at least one surface of the board.

BACKGROUND OF THE INVENTION

Recent environmental regulations and the depletion of old-growth forests have made it increasingly difficult and expensive to obtain high-quality lumber for use in wood products. One way to address the difficulty and expense of obtaining high-quality lumber is to use a veneer laminate. Veneered parts are created by affixing a higher-quality veneer, such as high-grade or clear wood or melamine, over a lower-quality core, such as medium density fiberboard (MDF), particleboard, plywood, laminated veneer lumber (LVL), or finger-jointed stock. Veneered laminates more efficiently utilize high-quality wood, reducing wood requirements and associated costs.

Manufacturing this veneered material requires several steps. After applying a laminate layer to the surface of a core, the edge of a laminated board may extend outward from the perimeter of one or both surfaces of the core. The overhanging laminate layer is undesirable, and is typically removed by striking the overhanging layer until it breaks closer to the edge of the core. This process often causes chipping of the veneer's edges, which may cause injury to the production personnel and end user as they handle the sharp edges of the material. Installers typically do not use the full sheet of material if it has cracks in the veneer around the perimeter. Therefore, end users often view the edge of the material as a waste product. p Therefore, there is a need for a process of removing overhang material which is highly accurate in production implementation, and which may be efficiently integrated into material manufacture to lower costs and improve results.

SUMMARY OF THE INVENTION

The present invention provides a simple and inexpensive device to automatically sense and trim the edge of a laminated board which has a laminate veneer extended outward from the top and/or bottom of the board. The cutting device maintains a preset distance from the edge of the board and trims the overhanging veneer. This invention is especially useful when trimming an overhanging layer from any type of regular or irregular shaped board. The present invention has a further advantage of providing sufficient positioning accuracy and repeatability to create smooth edges over a variety of surfaces including circles, arcs, polygons, etc.

According to a preferred embodiment of the invention, the single and/or dual surface trimmer and automatic edge sensing device is carried out by the use of a laser that is controlled and guided so as to remove overhanging laminate material by directing laser beam energy at the junction of the board and the laminate. A laminated board that needs trimming is placed in the laser cutting area and centered for cutting. The laser trimmer is then activated and a cutting beam begins moving along the perimeter of the board while trimming the overhanging laminate.

A sensor provides a feedback signal allowing relative positioning of the workpiece with respect to the laser beam. In an alternative embodiment, the sensor may provide a feedback signal allowing relative positioning of the laser beam with respect to the workpiece. The sensor is capable of sensing the edge of any type of regular or irregular shaped board, (circle, arc, polygon, etc.). The sensor detects the edge of the board and adjusts itself to cut at the junction of the board and the veneer laminate layer.

The laser proceeds around the perimeter of the board, cutting the excess melamine laminate layer from the top and/or bottom edges of the board at the same time. If there are any curves in the perimeter of the board or if the board is not straight in the cutting area, the automatic edge sensor will move the cutting head closer or farther from the board to keep the proper preset distance from the perimeter of the board while creating a smooth cutting edge.

The workpiece may be fastened to a standard production table or, alternatively, the workpiece may be mounted for relative movement in a two-axis positioner table. A robotic arm can also be used to guide the laser beam source in the required pattern extending in two or three dimensions.

Many other features, advantages, and objects of the invention will become apparent to those versed in the art upon reference to the accompanying drawings and detailed description, in which preferred embodiments incorporating the principles of the invention are disclosed as illustrative examples.

BRIEF DESCRIPTION OF THE DRAWINGS

The invention may be more completely understood by considering the detailed description of various embodiments of the invention that follows in connection with the accompanying drawings.

DETAILED DESCRIPTION OF THE PREFERRED EMBODIMENT

In the following detailed description, certain specific terminology will be employed for the sake of clarity, but it is to be understood that the same is not intended to be limiting and should not be so construed inasmuch as the invention is capable of taking many forms and variations within the scope of the appended claims.

Figure 1:
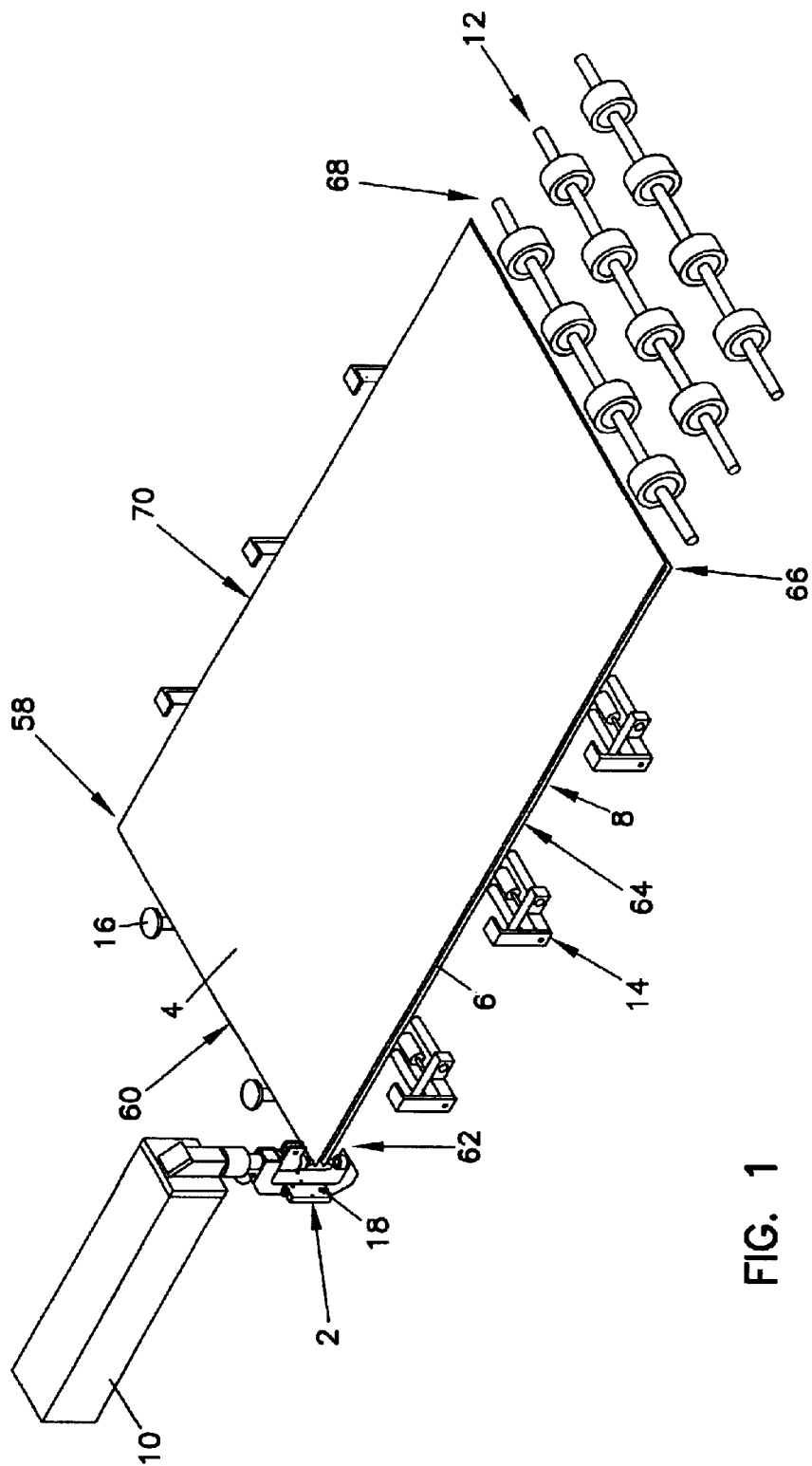
FIG. 1 is an isometric view of the automatic edge sensing laser cutter of the present invention in an exemplary production environment with workpiece shown.

A device employing the automatic edge sensing laser cutter of the present invention is illustrated in FIG. 1. A cutting head 2 is configured to facilitate the removal of overhanging portions of upper laminate 4 and lower laminate 6 from workpiece 8. Cutting head 2 is rotatably fastened to arm 10. Arm 10 can comprise a robot arm manipulator, and enables cutting head 2 to move about workpiece 8, while upper laminate 4 and lower laminate 6 are removed. As head 2 approaches a corner of workpiece 8, head 2 swivels to align head 2 with the next edge of the workpiece. In a preferred embodiment, head 2 is capable of delivering a laser beam 20 shown in FIG'S. 3 and 4 while rotating 360 degrees as it trims the perimeter of workpiece 8.

In an exemplary production environment, workpiece 8 is loaded onto feed rollers 12 and contacts sheet stop 16. Clamps 14 operate to position and square workpiece 8. Clamps 14 can preferably operate by pneumatic or electronic means, although such operation is not critical to the claimed invention.

Workpiece 8 may also be fastened to a multi-axis positioning system. Such systems are commercially available and may be driven by a multiplicity of electric motors controlled by a small computerized controller, or alternatively, by electromechanical actuation of a multiplicity of cams and mechanical devices which move workpiece 8 in a proper pattern about laser beam 20 at appropriately controlled rates.

Figure 2:
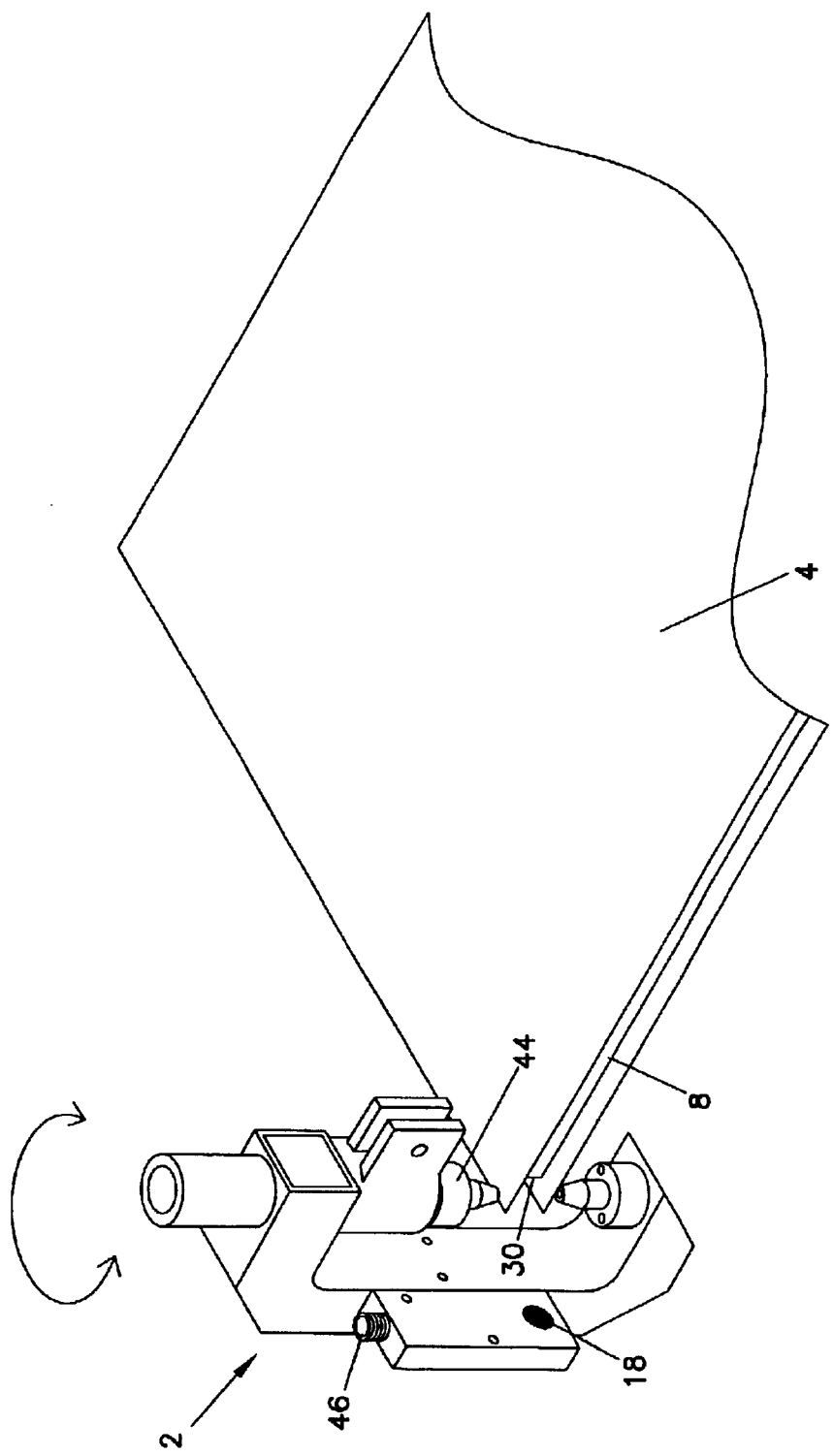
FIG. 2 is an partial isometric view of the automatic edge sensing laser cutter of the present invention with workpiece shown.

With reference to FIG. 2, sensor 18 is disposed on head 2. Sensor 18 generates signals corresponding to the distance of head 2 from the edge 30 of workpiece 8. The signals are interpreted by a microprocessor, Programmable Logic Controller (PLC), relays, or similar devices, and are used to control the motion of head 2. The device controlling the motion of head 2 can be adjusted to vary the degree of sensitivity. In many production settings for example, small chips or nicks in the edge 30 of workpiece 8 may be insignificant. In these situations, the cutting motion of head 2 would generally be unaffected. Sensor 18 may be connected to a microprocessor or similar device through connector 46, shown in FIGS. 2 and 3.

Sensor 18 can comprise a variety of forms and may be disposed at a variety of locations while remaining within the scope of the invention. However, the sensor 18 is preferably located in a position that allows sensor 18 to supply sufficient information to trim laminate 4 and laminate 6 from workpiece 8. In a preferred embodiment, sensor 18 is an ultrasonic sensor that precedes cutting beam 20 as the beam 20 moves along its cutting path. Such ultrasonic sensors capable of gauging features such as distance are commercially available, and hence the details are not given.

Figure 3:
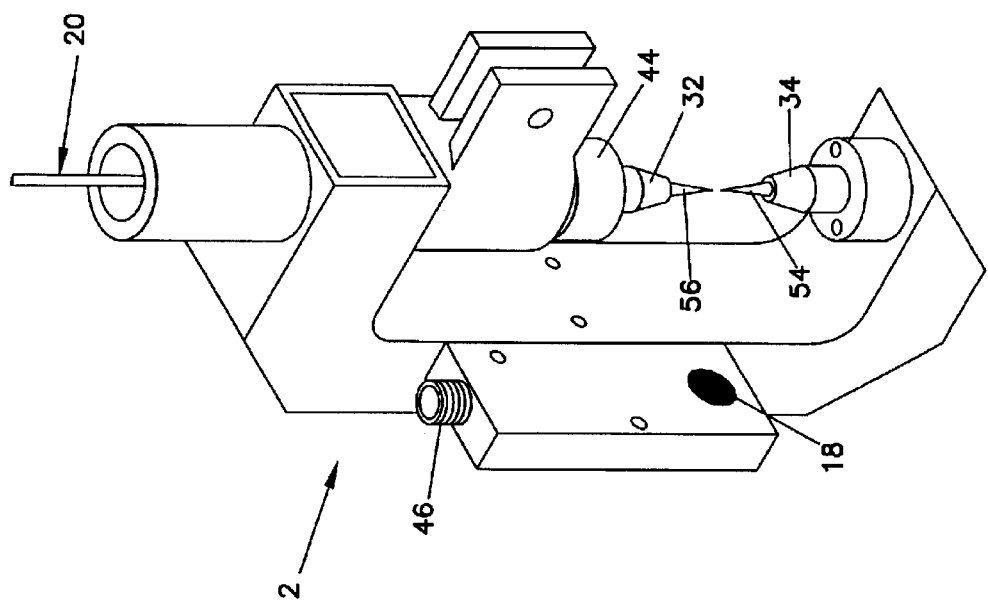
FIG. 3 is an isometric view of the automatic edge sensing laser cutter of the present invention.

FIG. 3 shows the path of laser beam 20 into cutting head 2. Beam 20 can be produced by several types of commercially available lasers. However, a carbon dioxide laser is likely to be the least expensive in both initial cost and cost over the required lifetime. Beam 20 can exit head 2 at either or both of the upper element 32 and lower element 34. The beam exiting lower element 34 terminates in vertex 54. The beam exiting upper element 32 terminates in vertex 56. When beam 20 exits lower element 34 and upper element 32 simultaneously, it is desirable to focus vertex 54 and vertex 56 to improve trimming performance.

In a preferred embodiment, head 2 is adjustable for trimming workpieces with a variety of thicknesses. Head 2 can be adjusted by moving top focus 44 relative to lower element 34. Upper element 32 moves in the same direction as top focus 44 and in proportion to top focus 44. Workpiece thicknesses of 0.125" to 1" are common dimensions, although workpieces with other thicknesses can also be trimmed using the present invention.

Figure 4:
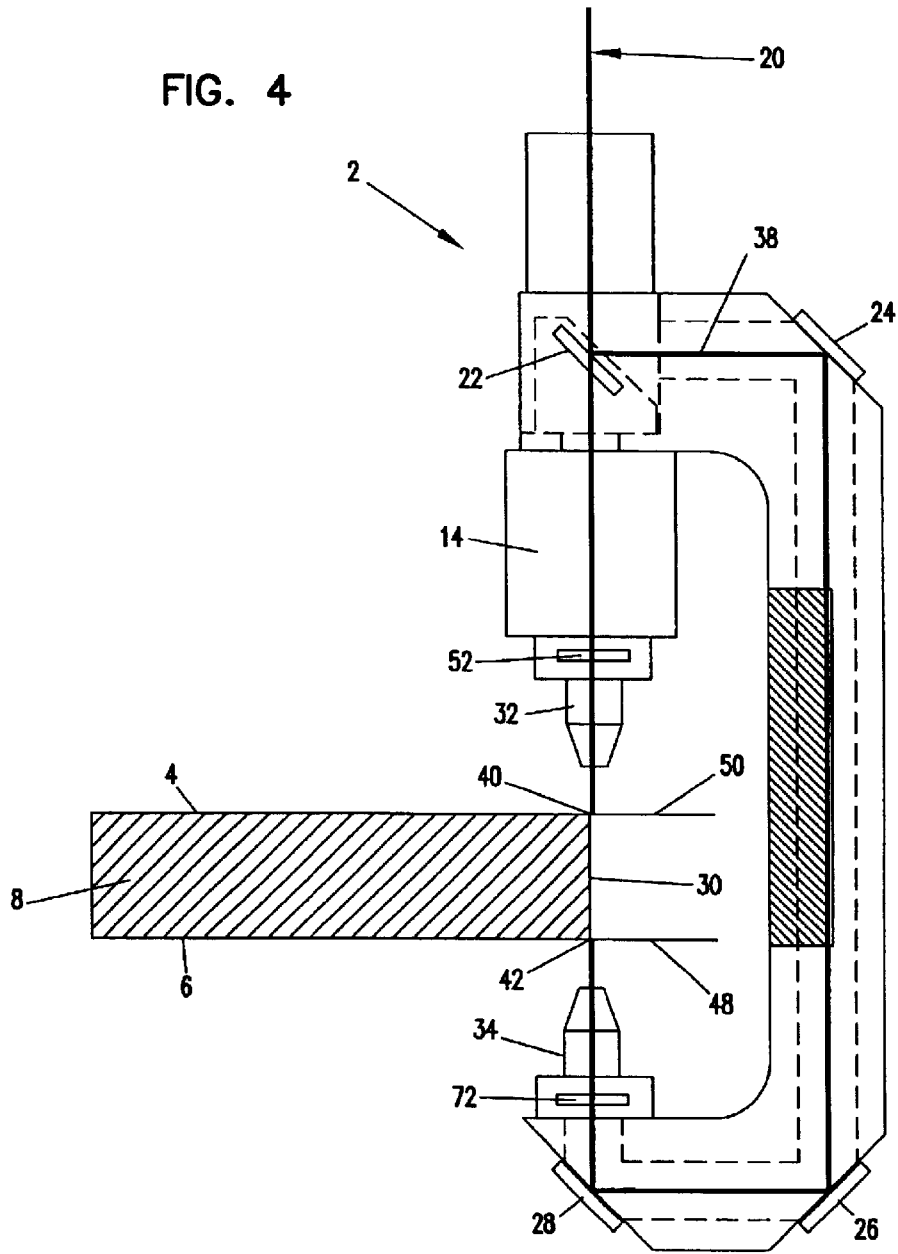
FIG. 4 is a cross-sectional side view showing the general internal structure of the automatic edge sensing laser cutter of the present invention.

FIG. 4 illustrates a cross-sectional view showing the internal operation of a preferred cutting head 2 as it trims laminate 4 and laminate 6 from workpiece 8. The portion of laminate 4 and 6 extending past edge 30 can be discarded as waste 48 and 50. Sensor 18, shown in FIGS. 1–3 detects the location of edge 30 of workpiece 8 relative to head 2. The position of head 2 is automatically adjusted based on information provided by sensor 18 shown in FIGS. 2 and 3.

Beam 20 enters head 2 near the area that head 2 is attached to arm 10. Beam 20 travels through beam splitter 22 which divides a portion of beam 20 into beam 36 and a portion of beam 20 into beam 38. In a preferred embodiment, head 2 is rotatably fastened to arm 10. Due to the rotational nature of head 2 relative to arm 10, it is desirable for the beam splitter to operate in all directions. Accordingly, beam splitter 22 is preferably an omni-directional beam splitter configured to evenly divide energy from beam 20 as head 2 rotates.

Beam 36 travels through focusing optic 52 and upper element 32, where it trims laminate 4 at the junction 40 of the workpiece 8 and laminate 4. In contrast, beam 38. contacts mirror 24, mirror 26, and mirror 28, and travels through focusing optic 72 and lower element 34. Beam 38 then trims laminate 6 at the junction 42 of workpiece 8 and laminate 6. Mirrors 24, 26, and 28 are preferably zero phase shift mirrors, which are commercially available and known in the art.

With reference to FIG. 1, an exemplary pattern of operation of the present invention will now be discussed. FIG. 1 shows a generally rectangular workpiece 8, although the present invention also performs well with irregular shaped workpieces, (circles, arcs, polygons, etc.).

After loading workpiece 8 onto rollers 12, workpiece 8 is secured by stop 16 and clamp 14. Next, cutting head 2, is oriented to workpiece 8 at corner 58 so that sensor 18 detects an edge of workpiece 8. It may be necessary to adjust head 2 for the thickness of workpiece 8. Head 2 can be adjusted using top focus 44, shown in FIGS. 2–4. The laser is then activated to produce beam 20, shown in FIGS. 3 and 4. Head 2 is positioned so vertex 54 and vertex 56 will be aligned at the junction of the laminated material and the edge of workpiece 8. Head 2 begins traveling along side 60 (the cutting axis shown in FIG. 1) at a relatively constant velocity toward comer 62. If the sensor detects a workpiece with a curved perimeter, arm 10 adjusts to move either forward or backward in a direction perpendicular to the cutting axis. As bead 2 travels, overhanging laminate 4 and 6 are removed from side 60.

When head 2 reaches corner 62, sensor 18 no longer detects the edge of workpiece 8 and the laser is deactivated. Next, head 2 rotates approximately 90 degrees until sensor 18 detects the edge of workpiece 8 along side 64, Side 64 becomes the new cutting axis and the laser is again activated to produce beam 20. Head 2 begins traveling at a generally constant velocity toward corner 66. Arm 10 may also adjust to the profile of side 64 by moving head 2 in a direction perpendicular to the cutting axis.

When head 2 reaches the corner 66, sensor 18 no longer detects the edge of workpiece 8 and the laser is deactivated. Next, head 2 rotates approximately 90 degrees until sensor 18 detects the edge of workpiece 8 along side 66. Side 66 becomes the new cutting axis and the laser is again activated to produce beam 20. Head 2 begins traveling at a generally constant velocity toward comer 68. Arm 10 may also adjust to the perimeter profile of side 66 by moving head 2 in a direction perpendicular to the cutting axis.

When head 2 reaches the comer 68, sensor 18 no longer detects the edge of workpiece 8 and the laser is again deactivated. Next, head 2 rotates approximately 90 degrees until sensor 18 detects the edge of workpiece 8 along side 70. Side 70 becomes the new cutting axis and the laser is again activated to produce beam 20. Head 2 begins traveling at a generally constant velocity toward comer 58. Arm 10 may also adjust to the profile of side 70 by moving head 2 in a direction perpendicular to the cutting axis.

When head 2 reaches corner 58, sensor 18 no longer detects the edge of workpiece 8 and the laser is again deactivated. Head 2 then rotates 270 degrees to the start position. Workpiece 8 can be removed and a new workpiece can be loaded onto rollers 12.

With regard to the foregoing description, it is to be understood that changes may be made in detail, especially in matters of the construction materials employed and the shape, size and arrangement of the parts without departing from the scope of the present invention. For example, it will be appreciated that the head 2 may work in conjunction with one laser or multiple lasers. Similarly, multiple cutting heads could be utilized, with each cutting head trimming a unique laminate. It is intended that the specification and depicted aspects be considered exemplary only, with a true scope and spirit of the invention being indicated by the broad meaning of the following claims.

I claim:

1. An apparatus for trimming at least one overhanging layer from a workpiece, the apparatus comprising:
    a laser configured to produce a cutting beam capable of cutting the overhanging layer;
    a cutting head, the cutting head comprising an upper element and a lower element, wherein the cutting head is configured to receive the cutting beam and split the cutting beam into a first portion and a second portion, wherein the first portion exits the cutting head through a upper element and the second portion exits the cutting head through a lower element; and
    a sensor configured to detect the position of the workpiece relative to the cutting head.

2. The apparatus of claim 1, further comprising an arm, wherein the cutting head is rotatably fastened to the arm.

3. The apparatus of claim 1, further comprising at least one clamp configured to position the workpiece.

4. The apparatus of claim 1, wherein the laser is a carbon dioxide laser.

5. The apparatus of claim 2, wherein the arm is a gantry capable of moving the cutting head relative to the workpiece.

6. The apparatus of claim 1, further comprising a multi-axis positioning system for moving the cutting head relative to the workpiece.

7. The apparatus of claim 1, further comprising a second laser configured to produce a cutting beam capable of cutting the overhanging layer.

8. The apparatus of claim 1, wherein the sensor is an ultrasonic sensor configured to generate signals corresponding to the distance of the head from the workpiece.

9. The apparatus of claim 1, further comprising a microprocessor configured to interpret signals from the sensor.

10. The apparatus of claim 1, wherein the microprocessor is configured to control the motion of the head.

11. The apparatus of claim 1, wherein the sensor is disposed on the cutting head.

12. The apparatus of claim 1, wherein the distance between the upper element and the workpiece is adjustable.

13. The apparatus of claim 1, wherein the cutting head can be adjusted for trimming workpieces with a variety of thicknesses.

14. The apparatus of claim 1, wherein the thickness is between 0.125" to 2".

15. The apparatus of claim 1, wherein the cutting head further comprises an omni-directional beam splitter.

16. The apparatus of claim 1, wherein the cutting head further comprises at least one focusing optic.

17. The apparatus of claim 1, wherein the cutting head further comprises at least one mirror.

18. A method of trimming a workpiece, the workpiece including a core with a perimeter, the workpiece also including at least one laminate layer dispsoed on the core and extending over at least a portion of the perimeter, the method comprising:
    providing at least one trimming means configured to remove the laminate layer extending over at least a portion of the perimeter;
    aligning the trimming means with the perimeter;
    moving the trimming means along the perimeter while the trimming means removes only the laminate surface extending over at least a portion of the perimeter; and
    securing the workpiece with a fastening means.

19. The method of claim 18, further comprising securing the workpiece with a vacuum means.

20. An automatic edge sensing laser cutter comprising:
    a laser configured to produce a cutting beam;
    a cutting head rotatable attached to the laser and configured to receive the cutting beam; a sensor disposed on the cutting head; and
    a cutting head comprising:
        a upper element;
        a lower element;
        an adjustable top focus for adjusting the distance between the upper element and the workpiece;
        an omni-directional beam splitter configured to evenly divide energy from the cutting beam as the cutting head rotates, wherein a portion of the energy exits the cutting head through the upper element and a portion of the energy exits the cutting head through the lower element; and
        at least one zero phase shift mirror for directing a portion of the energy through the lower element.

21. The automatic edge sensing laser cutter of claim 20, further comprising a means for positioning the cutting head relative to a workpiece.

22. The automatic edge sensing laser cutter of claim 20, further comprising a microprocessor for interpreting signals from the sensor.

23. The automatic edge sensing laser cutter of claim 20, further comprising an arm capable of moving the cutting head relative to a workpiece.

24. The apparatus of claim 20, further comprising a multi-axis positioning system for moving the cutting head relative to a workpiece.

* * * * *